(12) United States Patent
Oguchi et al.

(10) Patent No.: US 6,258,441 B1
(45) Date of Patent: *Jul. 10, 2001

(54) SOFT COAT FILM

(75) Inventors: Kiyoshi Oguchi; Yozo Kosaka, both of Tokyo (JP)

(73) Assignee: Dai Nippon Insatsu Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/128,413

(22) Filed: Aug. 4, 1998

Related U.S. Application Data

(62) Continuation of application No. 08/785,255, filed on Jan. 17, 1997, now abandoned, which is a continuation of application No. 08/351,076, filed on Nov. 30, 1994, now abandoned, which is a division of application No. 08/133,270, filed on Oct. 7, 1993, now Pat. No. 5,401,349, which is a continuation of application No. 07/656,058, filed as application No. PCT/JP90/00778 on Jun. 14, 1990, now abandoned.

(30) Foreign Application Priority Data

| Jun. 16, 1989 | (JP) | ................................... 11-154239 |
| Aug. 31, 1989 | (JP) | ................................... 11-225279 |
| Nov. 9, 1989 | (JP) | ................................... 11-291769 |

(51) Int. Cl.$^7$ .............................. B32B 27/40; B32B 3/26; B32B 27/28

(52) U.S. Cl. ........................ 428/141; 428/195; 428/203; 428/205; 428/343; 428/423.1; 525/125; 525/127; 525/920; 522/90; 522/95

(58) Field of Search ..................................... 428/141, 195, 428/203, 205, 343, 423.1; 525/125, 127, 920; 522/90, 95

(56) References Cited

U.S. PATENT DOCUMENTS

| Re. 32,406 | 4/1987 | Molari, Jr. ................. 428/412 |
| 3,437,514 | 4/1969 | Burlant ................. 117/93.31 |
| 3,658,620 | 4/1972 | Hall ..................... 156/272 |
| 3,709,752 | 1/1973 | Wistozky et al. ............. 156/79 |
| 3,793,102 | 2/1974 | Day ....................... 156/78 |
| 3,929,545 | 12/1975 | Van Dyck et al. ............. 156/272 |
| 3,936,254 | 2/1976 | Sawada et al. .............. 425/89 |
| 4,233,358 | 11/1980 | Jones et al. ............... 428/246 |
| 4,288,479 | * 9/1981 | Brack ..................... 428/40 |
| 4,336,089 | 6/1982 | Asperger .................. 156/152 |
| 4,462,852 | 7/1984 | Custor .................... 156/231 |
| 4,514,464 | 4/1985 | Gomez .................... 428/332 |
| 4,801,495 | 1/1989 | van der Hoeven ............. 428/286 |
| 4,840,757 | 6/1989 | Blenkhorn ................. 264/22 |
| 4,906,315 | 3/1990 | McGrew ................... 156/231 |
| 4,929,666 | 5/1990 | Schmidt et al. .............. 524/516 |
| 5,028,361 | 7/1991 | Fujimoto .................. 264/22 |
| 5,126,189 | 6/1992 | Tanny et al. ............... 428/220 |

FOREIGN PATENT DOCUMENTS

| 53-112933 | 10/1978 | (JP) . |
| 58-132519 | 8/1983 | (JP) . |
| 69-71624 | 4/1985 | (JP) . |
| 60-223815 | 11/1985 | (JP) . |
| 63-39931 | 2/1988 | (JP) . |
| 63-41520 | 2/1988 | (JP) . |

* cited by examiner

Primary Examiner—William P. Watkins, III
(74) Attorney, Agent, or Firm—Parkhurst & Wendel, LLP

(57) ABSTRACT

The present invention relates to a composition for soft coat films having a soft tactile impression, which is characterized by containing as essential components (a) an urethane acrylate having a molecular weight of 500–50,000 and (b) a tactile improver, and to a method for producing soft coat films using such a composition. The soft coat film obtained by the present invention has a soft surface tactile impression just like buckskin and excels in such surface properties as wear resistance, impact resistance and scuffing resistance.

7 Claims, 2 Drawing Sheets

SOFT COAT FILM

This is a continuation of application Ser. No. 08/785,255 filed Jan. 17, 1997, now abandoned, which in turn is a continuation of application Ser. No. 08/351,076 filed Nov. 30, 1994, now abandoned, which in turn is a divisional application of Ser. No. 08/133,270 filed Oct. 7, 1993 now U.S. Pat. No. 5,401,349, which in turn is a continuation of application Ser. No. 07/656,058 filed Feb. 11, 1991, now abandoned, which is the National Stage under 35 U.S.C. 371 of PCT/JP90/00778 filed Jun. 14, 1990.

TECHNICAL FIELD

The present invention relates to a soft coat film designed to be bonded to the surfaces of articles such as electrical appliances and furniture and, more particularly, to a soft coat film which is improved in terms of not only moldability and injury recovery but also wear resistance, impact resistance, scuffing resistance, tactile impression and so on.

BACKGROUND TECHNIQUE

In recent years, plastic materials including engineering plastics have been widely used as an alternative to metal materials or inorganic materials such as glass by taking advantage of their toughness, processability, etc. However, they must be provided with surface protecting layers due to their inferior surface hardness and scuffing resistance.

According to conventional techniques for making the surfaces of plastics hard, heat-curing resins such as those based on organosiloxane and melamine or polyfunctional polyacrylic photosetting resins have been coated on them, or thin metal films have been formed on them by vacuum deposition, sputtering or other means.

A problem with conventional scuffing-resistant surface protecting layers obtained with heat-curing or photosetting resins, however, is that they are so lacking in flexing properties that they are likely to crack. Thus, when forming surface protecting layers on curved moldings or synthetic resin films, they are still far from satisfactory, since some difficulty is involved in processing them into curved shapes or they crack by flexing. Even when used as surface protecting layers for flat planes, they are disadvantageous in that once injured, they are never restored to the original state or remain seriously damaged. Problems with surface protecting layers formed of thin metal films, on the other hand, are that because of being processed in vacuo, they are of low productivity and have difficulty in being processed into large sizes.

DISCLOSURE OF THE INVENTION

It is, therefore, an object of this invention to provide a soft coat film which is improved not only in terms of moldability and injury recovery but also in terms of scuffing resistance, impact resistance, wear resistance, tactile impression and so on, and can protect the surfaces of plastic, metallic, wooden and other products.

As a result of intensive studies made with the above object in mind, the present inventors have found that a soft coat film excelling in scuffing resistance, impact resistance, wear resistance, feel and other properties can be obtained by coating a film with a composition containing an urethane acrylate of a specific structure and irradiating that film with ionizing radiations. This finding underlies the present invention.

According to one aspect of this invention, there is provided a composition for soft coat films, which is characterized by containing as essential components (a) an urethane acrylate having a molecular weight of 500–50,000 and (b) a tactile improver.

The inventive soft coat film having a soft feel of tactile impression is characterized in that it is provided with a resin layer set by irradiating the aforesaid composition with ionizing radiations.

According to another aspect of this invention, there is provided a method for making soft coat films having a soft feel, which is characterized by forming between a support film and a laminating film a composition layer composed of a soft coat film composition containing (a) an urethane acrylate having a molecular weight of 500–50,000 and (b) a tactile improver, irradiating the thus obtained support film/composition layer/laminating film laminate with ionizing radiations to set the composition in said laminate, and releasing only said laminating film from said laminate.

BRIEF DESCRIPTION OF THE DRAWINGS

FIG. 1 is a partially schematic cross-sectional side view of a method of making a soft coat film in accordance with one technique of the present invention.

FIG. 2 is a partially schematic cross-sectional side view of a method of making a soft coat film in accordance with a second technique of the present invention.

FIG. 3 is a partially schematic cross-sectional side view of one manner of forming a matted resin layer with fine surface irregularities used in the soft coat film of the present invention.

FIG. 4 is a partially schematic cross-sectional side view of a method of making a soft coat film in accordance with a third technique of the present invention.

BEST NODE FOR EMBODYING THE INVENTION

Figure 1:
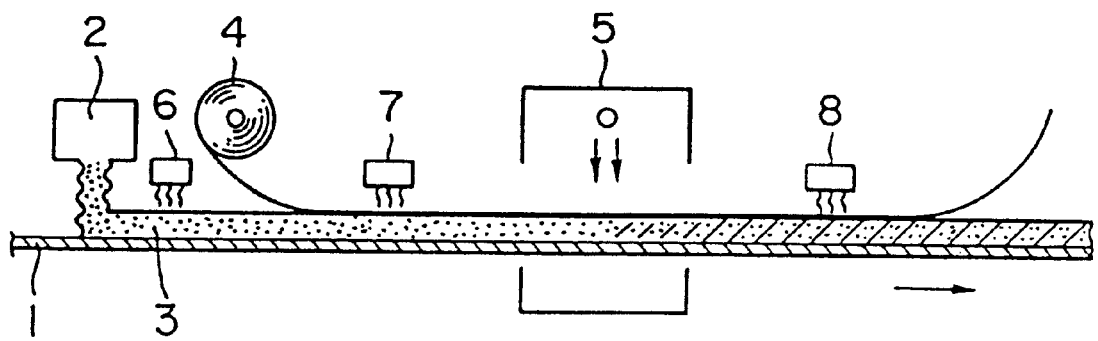
FIGS. 1 to 4 each illustrate a general structure of equipment for carrying out the inventive method for making soft coat films.

The soft coat films according to this invention will now be explained in greater detail.

The composition forming the resin layer in the inventive soft coat film is characterized by containing an urethane acrylate consisting of an isocyanate compound having at least two isocyanate groups, a compound having 1–4 hydroxyl groups and a compound having 1–2 hydroxyl group and 1–5 radically polymerizable unsaturated groups and having a molecular weight of 500–50,000 or an urethane acrylate consisting of an isocyanate compound having at least two isocyanate groups and a compound having 1–4 hydroxyl groups and 1–5 radically polymerizable unsaturated groups and having a molecular weight of 500–50,000.

The isocyanate compounds usable in this invention may include aliphatic or aromatic isocyanate compounds having at least'two, particularly 2–3 isocyanate groups a molecule. Illustrative mention is made of tetramethylene diisocyanate, hexamethylene diisocyanate, 2,4-tolylene diisocyanate, 2,6-tolylene diisocyanate, 4,4'-diphenylmethane diisocyanate, 1,5-naphthalene diisocyanate, 1,5-naphthalene diisocyanate, 3,3-dimethyl-4,4'-diphenylene diisocyanate, isophorone diisocyanate, xylylene diisocyanate, 1,3-bis (isocyanatomethyl)cyclohexane, trimethylhexamethylene diisocyanate, hydrogenated 4,4'-diphenylmethane diisocyanate, hydrogenated xylylene diisocyanate and isocyanates represented by the following formulae, which may be used alone or in admixture.

$$OCNR_1NCO,$$

or $$R_2-(NCO)_3$$

wherein $R_1$ represents a hydrocarbon group having 4–14 carbon atoms, and $R_2$ has an isocyanurate or trimethylolpropane skeleton.

In addition, the following isocyanate compounds (a)–(g) may be used.

(a)
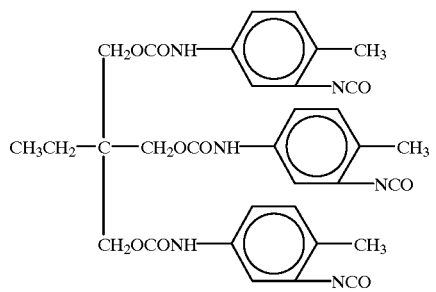

(b)
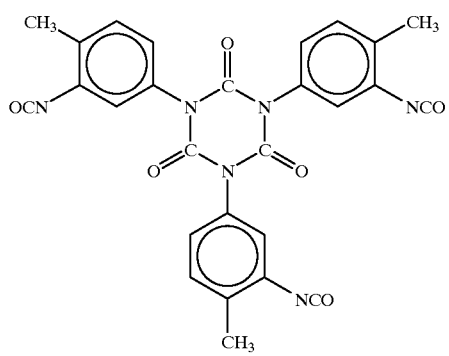

(c)
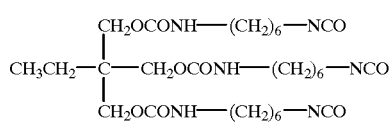

(d)

(e)
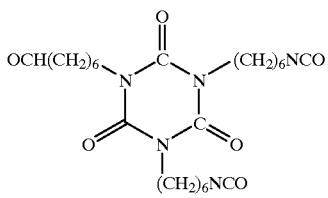

(f)
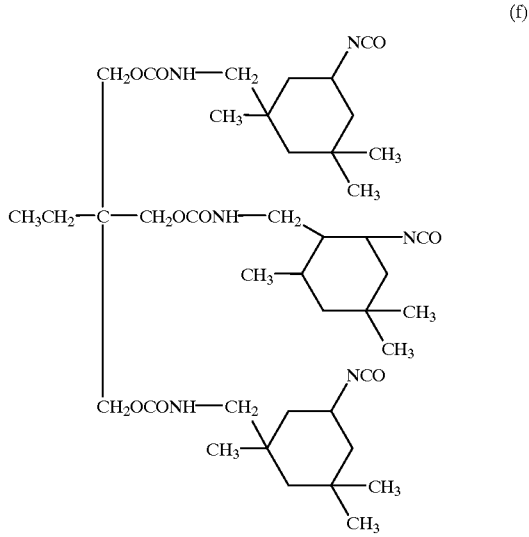

(g)
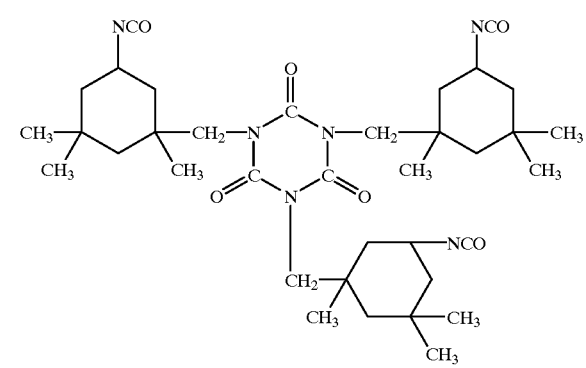

In view of weather resistance in particular, isophorone diisocyanate, hexamethylene diisocyanate, hydrogenated 4,4'-diphenylmethane diisocyanate and hydrogenated xylylene diisocyanate as well as such compounds (d)–(g) as referred to above are desired.

The compounds (monomers) having 1–4 hydroxyl groups, by way of example alone, may include ethanol, propanol, 1,3-butanediol, trimethylolpropane, pentaerythritol and diglycerol as well as polyester, polyether, polycarbonate and polybutadiene prepolymers having hydroxyl groups.

Included in the polyester prepolymers having 1–4 hydroxyl groups, for instance, are (i) adducts of aromatic or spiro-skeletal diol compounds with lactone compounds or their derivatives or epoxy compounds, (ii) condensates of polybasic acids with polyols and (iii) split polyester compounds derived from ring ester compounds. These prepolymers may be used alone or in combination with two or more.

The aromatic or spiro-skeletal diol compounds used to prepare the adducts (i), for instance, may include:

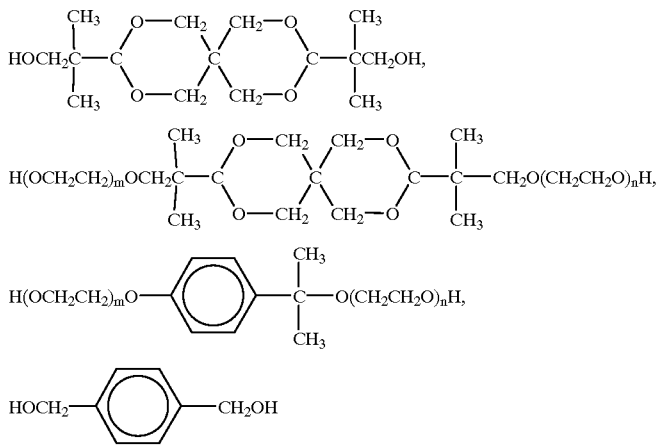

Typical lactone compounds are ε-lactone, δ-valerolactone or the like.

Typical epoxy compounds are ethylene oxide, propylene oxide or the like.

Included in the polybasic acids used to obtain the condensates (ii), for instance, are saturated polybasic acids such as phthalic, isophthalic, terephthalic acid, adipic, succinic and sebacic acids or unsaturated polybasic acids such as maleic, fumaric, itaconic and citraconic acids, and embraced in the polyols, for instance, are ethylene glycol, diethylene glycol, 1,4-butanediol and 1,6-hexane glycol.

Included in the polyether prepolymers with 1–4 hydroxyl groups, for instance, are polytetramethylene ether glycol, polyethylene. glycol and polypropylene glycol.

As the polycarbonate prepolymers with 1–4 hydroxyl groups, for instance, mention is made of polycarbonate diols such as Prakcel CD-210 (M.W.; 1,000) and Prakcel CD-220 (M.W.: 2,000), both made by Daicel Chemical Industries, Ltd. and DN-983 (M.W.: 1,000) made by Nippon Polyurethane Kogyo K.K.

As the polybutadiene prepolymers, for instance, mention is made of diols having OH groups at both their ends such as 1,4-polybutadiene and 1,2-polybutadiene.

The compounds having 1–2 hydroxyl groups and 1–5 radically polymerizable unsaturated groups or the so-called radically polymerizable compounds allow their unsaturated groups to bond to the isocyanate groups of the isocyanate compounds and generate radicals easily by exposure to electron beams, thereby giving rise to a crosslinking reaction. The radically polymerizable compounds having such hydroxyl groups may be acrylic or methacrylic acid or ester compounds of their derivatives such as (meth)acrylic ester compounds having one polymerizable unsaturated group, e.g. hydroxyethyl acrylate, hydroxypropyl acrylate, hydroxybutyl acrylate, hydroxyethyl methacrylate, hydroxypropyl methacrylate, hydroxybutyl methacrylate, 4-hydroxycyclohexyl acrylate, 5-hydroxycyclooctyl acrylate and 2-hydroxy-3-phenyloxypropyl acrylate. In addition, use may be made of ester compounds having two polymerizable unsaturated groups, e.g. one represented by the following formula:

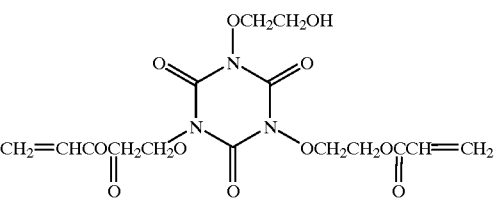

Pentaerythritol triacrylate, dipentaerythritol pentaacrylate and so on may be used as well.

The second urethane acrylate according to this invention is obtainable by allowing an isocyanate compound to react with a compound having 1–4 hydroxyl groups and 1–5 radically polymerizable unsaturated groups, as is the case with the first urethane acrylate, and has a molecular weight of 500–50,000. The aforesaid compound having radically polymerizable unsaturated groups, for instance, may be represented by:

wherein R stands for a hydrocarbon residue.

By way of example alone, how to prepare the aforesaid urethane acrylate using the diisocyanate and diol will now be explained.

The first step at which the diisocyanate is used with the diol having hydroxyl groups at both its ends is expressed by the following reaction scheme:

(1)

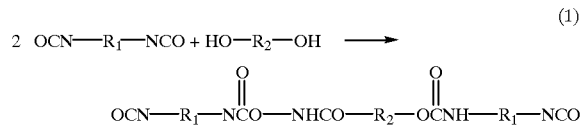

wherein $R_1$ stands for a $C_{4-14}$ hydrocarbon group and $R_2$ denotes a diol residue.

The first-step reaction takes place at a temperature of 40–6° C. for 1–4 hours, and may be carried out in the presence or absence of a solvent.

At the second step, an acrylate compound having hydroxyl groups and radically polymerizable unsaturated groups is permitted to react with the terminal of the reaction product obtained at the first step, typically according to the following reaction scheme.

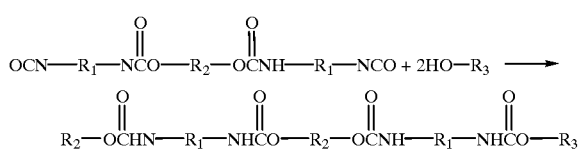

(2)

wherein $R_3$ stands for an acrylate residue (an acrylic or methacrylic ester group).

It is noted that instead of causing all the isocyanate residues to react with the radically polymerizable compound, its one end may be permitted to react with a triol such as trimethylolpropane to leave three residues of the radically polymerizable compound in one molecule.

The second-step reaction occurs at a temperature of 40–100° C. for 2–6 hours, and may be carried out in the presence or absence of a solvent, as is the case with the first-step reaction.

It is understood that ca. 1,000 ppm of a polymerization inhibitor such as hydroquinone, hydroquinone monomethyl ether, benzoquinone or 2,6-di-t-butyl-p-cresol should preferably be added to the second-step reaction system so as to protect the (meth)acrylic ester group of the radically polymerizable acrylate compound. With a view to accelerating the reaction involved, it may also be possible to add to the reaction system such compounds as triethylamine, piperazine, triethanolamine, dibutyltin dilaurate, stannous octoate, stannous laurate and dioctyltin dilaurate.

The thus obtained urethane acrylate is characterized by having a molecular weight of 500–50,000. Such a high molecular weight derives from the number of repetition of the diisocyanate and diol units or the molecular weight of the compound having hydroxyl groups.

The composition used to produce the soft coat film according to this invention may be obtained by sole use of the urethane acrylate. If desired, however, it may be mixed with one or more or two compounds (esp. acrylic monomers), each having at least one radically unsaturated group a molecule.

Of such acrylic monomers capable of being mixed with the urethane acrylate, the monofunctional acrylic monomers may include acrylic esters such as methyl acrylate, 2-ethylhexyl acrylate, methoxyethyl acrylate, butoxyethyl acrylate, butyl acrylate, methoxybutyl acrylate, phenyl acrylate, ethoxydiethylene glycol acrylate, tetrahydrofurfuryl acrylate, phenoxy acrylate, 2-hydroxypropyl acrylate, methoxyethylene glycol acrylate, acrylic acid dimer, nonyl phenolethylene glycol acrylate, 2-hydroxy-3-phenoxypropyl acrylate, isoamyl acrylate, methoxydipropylene glycol acrylate, 2-acryloyloxyethyl succinate, 2-acryloyloxyethyl-2-hydroxyethyl phthalate, 2-acryloyloxyethyl hexahydrophthalate, 2-acryloyloxyethyl acid phosphate, 2-hydroxybutyl acrylate, benzyl acrylate and nonyl phenol-10-ethylene glycol acrylate or their corresponding methacrylic esters; unsaturated carboxylic acid amides such as acrylamide and methacrylamide; substituted amino-alcohol esters of unsaturated acids such as 2-(N,N-dimethylamino)ethyl acrylate, 2-(N,N-dimethylamino)ethyl methacrylate, 2-(N,N-dipentylamino)ethyl acrylate, (N,N-dimethylamino)methyl methacrylate and 2-(N,N-dimethylamino)propyl acrylate; carbamoyloxyalkyl acrylates such as N-methylcarbamoyloxyethyl acrylate, N-ethylcarbamoyloxyethyl acrylate, N-butylcarbamoyloxyethyl acrylate, N-phenylcarbamoyloxyethyl acrylate, 2-(N-methylcarbamoyloxy)ethyl acrylate and 2-carbamoyloxypropyl acrylate; N-vinyl-2-pyrrolidones; and so on.

The polyfunctional acrylic monomers have at least two radically polymerizable unsaturated groups. In particular, polyfunctional (meth)acrylates having at least two (meth) acryloyl groups are preferred. Illustrative mention is made of polyfunctional (meth)acrylates such as ethylene glycol di(meth)acrylate, polyethylene glycol di(meth)acrylate; hexanediol di(meth)acrylate, trimethylolpropane tri(meth) acrylate, trimethylolpropane di(meth)acrylate, pentaerythritol tetra(meth)acrylate, pentaerythritol tri(meth)acrylate, dipentaerythritol hexa(meth)acrylate, ethylene glycol diglycidyl ether di(meth)acrylate, polyethylene glycol diglycidyl ether di(meth)acrylate, propylene glycol diglycidyl ether di(meth)acrylate, polypropylene glycol diglycidyl ether di(meth)acrylate, sorbitol tetraglycidyl ether tetra(meth) acrylate and melamine (meth)acrylate.

Although depending upon the acrylic component content of the urethane acrylate, the urethane acrylate and acrylic monomer should preferably be used in such a way that the acrylic monomer accounts for about 5–80% by weight of the composition.

It is understood in this connection that an urethane compound may be used in place of the urethane acrylate, as will be described hereinafter, since the urethane acrylate and acrylic monomer are crosslinked together by exposure to ionizing radiations. Usable to this end are urethane compounds obtained by the reaction of isocyanate compounds having at least two isocyanate groups with compounds having 1–4 hydroxyl groups. The isocyanate and hydroxyl-containing compounds used may all be the same as referred to in the foregoing. When using the urethane compound, the urethane compound and acrylic monomer are again used at such a proportion that the acrylic monomer accounts for 20–80% by weight of the composition.

Preferably, the soft coat film according to this invention should contain one or two or more tactile improvers in an amount of 0.05–15 parts by weight per 100 parts by weight of the resinous component so as to impart a good feel i.e., soft tactile impression, thereto.

The tactile improver or improvers, which may be used in liquid or powdery forms, is or are selected from silicones, waxes, fluorocarbon resin surfactants such as polytetrafluoroethylene and so on. In too large an amount, however, the improvers are likely to be less adhesive to the support film. Thus, they should preferably be added to the resin in an amount lying in the range of 0.05–10% by weight.

Suitable as the practically used silicone, for instance, are amino, ether or mercapto-modified silicone, OH group-containing silicone and UV or EB setting silicone. The waxes used, for instance, are polyethylene glycol and polytetramethylene glycol. Silicone and wax powders, etc. may be used as well.

If required, the resinous composition used in this invention may additionally contain UV absorbers and light stabilizers. Usable as the UV absorbers, for instance, are benzotriazoles such as 2-(2-hydroxy-5-methylphenyl) benzotriazole, 2-(2-hydroxy-3,5-di-tert.-amylphenyl) benzotriazole and 3-[3(benzotriazole-2-yl-5-t-butyl-4-hydroxyphenyl] propionate of polyethylene glycol. Suitable as the light stabilizers, for instance, are hindered amines such as 2-(3,5-di-t-butyl-4-hydroxybenzyl)-2'-n-butylmalonate, bis(1,2,2,6-pentamethyl)-4-piperidyl) bis(1, 2,2,6,6-pentamethyl-4-piperidyl sebacate and tetrakis(2,2,6, 6-tetramethyl-4-piperidyl)-1,2,3,4-butane tetracarboxylate.

Combined use of the UV absorbers and light stabilizers results in remarkable improvements in weather resistance.

The UV absorbers and light stabilizers are used in the respective amounts of 0.01–10 parts by weight per 100 parts by weight of the resinous composition. In particular, it is desired that 0.1–2 parts by weight of the UV absorber and 0.5–4 parts by weight of the light stabilizer be simultaneously added to the resinous composition. Too small amounts are less effective for improvements in weather resistance, whereas too small amounts give rise to adverse influences such as drops of setting properties and adhesion.

The thus obtained EB setting resinous composition is sticky before setting. This is important, because the shape and physical properties (e.g. wear resistance) of the resulting coat cannot be well controlled without stickiness before setting.

The support film used in this invention may be made of polyester, polyethylene, polypropylene, polyvinyl chloride, polyvinylidene chloride, polycarbonate, nylon, polystyrene, ethylene/vinyl acetate copolymers, ABS, etc.

In this invention, a film of about 6–500 µm in thickness may be used as the support film. Particularly preferred results are obtainable, if the support film used has a thickness of the order of 25–250 µm.

In this invention, the coat of resin set by exposure to electron beams has a thickness in the range of 2–150 µM. At less than 2 µm no sufficient scuffing resistance is attainable. At a certain or larger thickness, on the other hand, the soft coat film is unlikely to curl up. However, setting becomes insufficient at a thickness exceeding 150 µm.

The coat of resin set by exposure to electron beams is formed as follows.

A coating material with or without a solvent is first prepared. Usable as the solvent are alcohols such as methanol, ethanol, isopropanol, methyl cellosolve and ethyl cellosolve; ketones such as methyl ethyl ketone, acetone and methyl isobutyl ketone; esters such as ethyl acetate and butyl acetate; aromatic hydrocarbons such as toluene and xylene; or mixed solvents thereof; and so on.

Coating, for instance, may be achieved by suitable means such as blade coating, gravure coating, rod coating, knife coating, reverse roll coating and offset gravure coating.

Electron beams may be immediately applied to the coat. In the case of planishing, however, reliance may be placed upon the method set forth in Japanese Patent Kokai Publication No. Sho. 57-22204.

With such an arrangement as shown schematically in FIG. 1, a coating solution 3 of the resin composition is first coated on a support film 1 by means of an applicator 2. Then, a planished material 4 is laminated on the film 1 through its mirror surface, followed by the setting of the coat with an electron beam irradiator 5. Finally, the planished material 4 is released off the support film 1. If required, pre- and post-heating may be carried out before and after the irradiation of electron beams, using heaters 6 and 7 for pre-heating and a heater 8 for post-heating, respectively.

Figure 2:
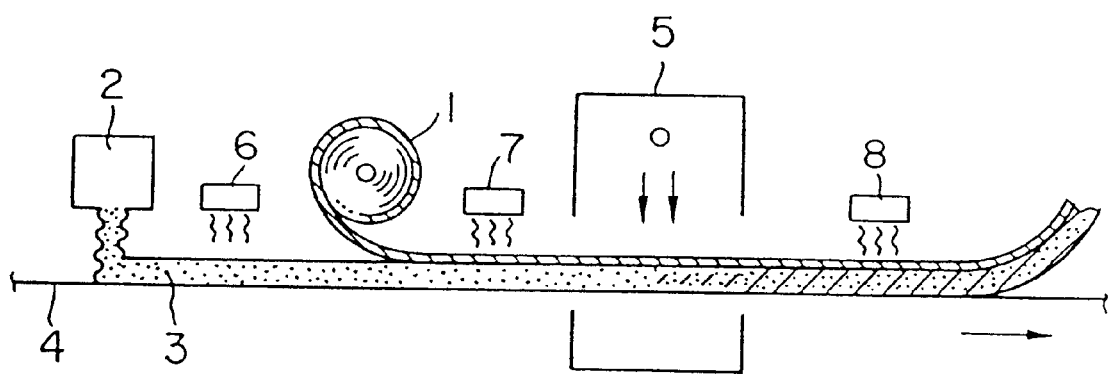

Referring then to FIG. 2, a coating solution 3 is applied on a planished material 4 with the use of an applicator 2. Then, a support film 1 is laminated on the material 4, followed by the setting of the coat by means of an electron beam irradiator 5. Finally, the set mass is released from the planished material 4. If required, pre-heating and post-heating may again be carried out with heaters 6, 7 and a heater 8, respectively.

As the planished materials use may be made of such materials as metal plates or sheets, plastic films, resin-coated papers or films, metallized films or papers and glass.

By using matted sheets or panels (e.g. polyethylene terephthalate sheets) in place of the planished materials, matted coats may be obtained. Unlike non-glare layers containing, e.g. silica particles, the non-glare layers obtained in this case do not scatter light and are well uniform on their surfaces, since they have a uniformly irregular pattern on their surfaces.

Figure 3:
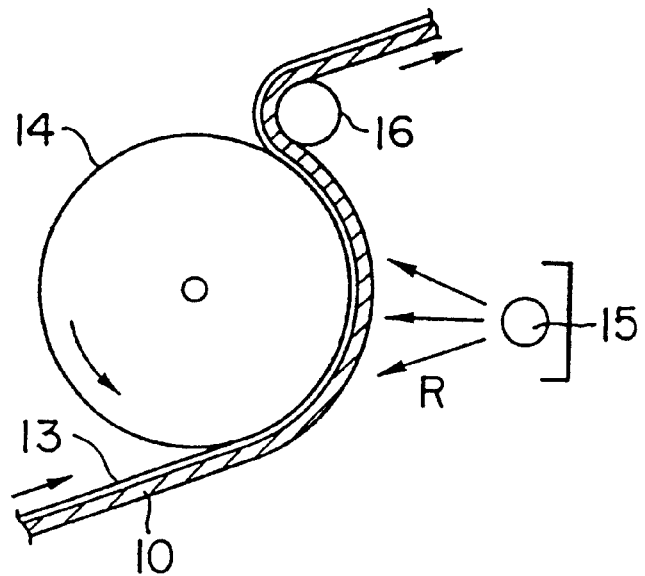

FIG. 3 illustrates an example of how to obtain a matted resin layer having fine irregularities on its surface. After a coating solution 13 is applied on a support film 10, it is exposed to electron beams from an electron beam irradiator 15 while it is pressed against and engaged with a laminating roll to which fine irregularities have been imparted, whereby a coat 13 is set. Thus, the fine irregularities on the laminating roll 14 are transferred onto the surface of the set coat. Subsequent release of the film from the roll 14 by a roll 16 gives a matted film having fine irregularities on its surface.

Figure 4:
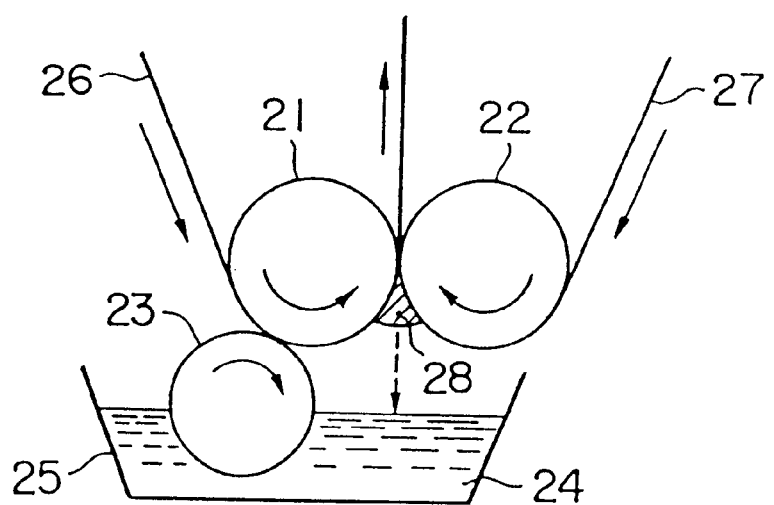

Reference will now be made to how to form a support film/resin layer/laminating film laminate by such a laminating method as illustrated in FIG. 4.

This laminating method for applying the aforesaid composition on a support film is characterized by providing support and laminating films; locating the two films together between a pair of rolls; carrying the two films under pressure while feeding said composition therebetween to form a layer of said composition therebetween and forcing out an excessive amount of said composition fed with a pressure with which said two films are pressed together between said rolls, whereby a mass of said composition is formed on the border between said two films at an inlet of a gap defined between said rolls, thereby preventing a gas from entering the layer of said composition formed between said two films; irradiating the obtained support film/composition/laminating film laminate with ionizing radiations to crosslink said composition therein; and releasing said laminating film from said laminate to form a resin layer on the surface of said support film.

According to usual techniques used for laminating films together, at least one film is coated with a composition in the amount required for lamination, and is then pressed against the other film in a gap defined between rolls such as nip rolls. A problem with these techniques, however, is that when the coating solution is coated ununiformly, laminated in the form of a thick layer or the like, air bubbles are likely to enter the coat layer.

Inclusion of air in the coat layer does not only result in a drop of quality but is also responsible for poor appearance, blistering, etc. In addition, when a resin layer is set following lamination, air inclusions behave as a reaction inhibitor, making the setting of the resin layer insufficient.

According to the method according to this invention, however, a pair of films are pressed together with the coating solution—composed of the aforesaid composition—located therebetween in an amount larger than required to obtain the desired film thickness, so that an excessive amount of the ink is forced out by the pressure applied to form a mass of the ink, which in turn prevents inclusion of air bubbles, etc. effectively.

FIG. 4 is a schematic view illustrative of the laminating method according to this invention.

The arrangement shown in FIG. 4 comprises a pair of nip rolls 21 and 22, a coating roll 23 and a coating reservoir 25.

In such a system, one film, e.g. a support film 26 is supplied through between the nip roll 21 and the coating roll 23 into a gap between the nip rolls 21 and 22. Since the coating roll 23 is covered on its surface with a coating solution 24 contained in the reservoir 25, the support film 26 reaches an inlet of the gap between the nip rolls 21 and 22 after it has been coated with the coating solution 24.

At that time, the gap between the coating roll 23 and the nip roll 21 is regulated in such a way that the amount of the coating solution 24 to be applied on the support film 26 is larger than required for lamination.

A laminating film 27, on the other hand, is fed through the nip roll 22 into the inlet of the gap.

The support and laminating films 26 and 26 fed into the inlet of the gap are pressed and laminated together between the nip rolls 21 and 22. In this case, the coating solution is coated in an amount larger than required to obtain the desired film thickness, so that an excessive amount of the ink is forced out by the pressure applied toward the inlet of the gap, where an ink mass 28 is formed.

By forming the ink mass 28 in this way, the support and laminating films 26 and 27 are fully covered on their surfaces of contact with the ink at the time of lamination. It is thus possible to laminate the two films together without contacting air and, hence, to prevent inclusion of air in the coat layer effectively.

In the illustrated embodiment, the ink mass 28 is so located on the lower side of the roll gap that upon reaching a certain size, the ink can trickle down, as shown by a broken line in FIG. 4. Recovery and recycle of excessive ink, as achieved by receiving it in the reservoir 25, would offer an economical advantage.

It is noted that the amount of the ink applied in dents may be regulated by adjusting the gap between the nip rolls 21 and 22 in such a way that the composition layer having a desired thickness is obtainable depending upon the thickness of the support and laminating films 26 and 27 and the type of ink used.

After the support and laminating films 26 and 27 have been laminated together as mentioned above, a soft coat film can be obtained by setting the coating solution with the aid of drying means or setting means such as ultraviolet rays and electron beams, followed by peeling only the laminating film off the support film.

No critical limitation is placed on materials of which the laminating film 26 usable with the laminating method according to this invention is made. For instance, various materials may be used, including films or sheets of synthetic resins, e.g. polyesters such as polyethylene terephthalate, polyolefins such as polyethylene and polypropylene, polyamides such as nylon, polycarbonates, polyacrylates, polystyrene and polyvinyl chloride; synthetic or natural papers; and so on.

When a matted film having fine irregularities is used as the laminating film, it should preferably have its surface roughness lying in the range of 0.2–100 $\mu$m as expressed in terms of Ra—center-line average roughness—measured according to JIS-B0601.

Reference will now be made to how to set the aforesaid resin layer.

As already mentioned, the resin layer is set by exposure to ionizing radiations such as electron beams and ultraviolet rays. According to this invention, however, the resin layer may be set with a single or plural doses of ionizing radiations.

For instance, the resin layer may be set with plural doses of ionizing radiations in the following successive manner.

The laminate is successively irradiated with (a) a first dose of radiations from the support film side and (b) a second dose of radiations from the laminating film side.

In an alternative embodiment, the resin layer may be set with plural doses of ionizing radiations in the following successive manners.

(a) The laminate is successively irradiated with (a) a first dose of radiations from the laminating film side and (b) a second dose of radiations from the support film side.

In a further embodiment, the resin layer may be set with plural doses of ionizing radiations in the following successive manner.

The laminate is successively irradiated with a first dose of ionizing radiations from the laminating or support film side until the resin layer has a gel fraction reduced to 90% or less and (b) with a second dose of ionizing radiations from the laminating or support film side until the resin layer is set substantially to perfect.

Such irradiation of ionizing radiations in plural doses will now be explained more illustratively.

The laminate is irradiated with ionizing radiations in the following two-stage manner.

First, the laminate is irradiated with a first dose of ionizing radiations from the support film side (or from the side of the resin layer to be not activated), which pass through the support film to cause a partial setting of the resin layer applied on the opposite surface thereof. Such a setting occurs primarily in the vicinity of the surface of the support film, i.e. in a deep part of the resin layer. In other words, a surface part of the resin layer (close to the laminating film) is not completely set.

Subsequently, the laminate is irradiated with ionizing radiations from either one side or both sides thereof to set the resin layer completely. In other words, the laminate may be irradiated with the radiations from (a) the side to be activated or (b) the side to be not activated or (c) both. Practically, it is preferred that the laminate be exposed to the radiations from the side to be activated, thereby setting the resin layer. If required, the second-stage irradiation may be carried out twice or more.

The above-mentioned method makes it possible to distribute the additive locally on the surface of the layer set by ionizing radiations, keeping the obtained film surface stable and permitting it to be well activated.

By irradiating the laminate successively with the first dose of ionizing radiations from the backside of the support film coated with a resin containing an additive for activating the resin layer to set a deep region of the resin layer partly and with the second dose of ionizing radiations from either one side or both sides of the support film, it is possible to obtain a set layer having the additive component (the feel improver) distributed or precipitated locally on its surface region. Such a local distribution of the additive component on the set layer enables the film surface to be more activated.

Although the inventors have yet to learn the reason why this invention produces such an effect as mentioned just above, it is believed that as the deep region of the resin layer is set by the first-stage irradiation of ionizing radiations, the feel improver is more likely to migrate onto the surface region of the resin layer, since the latter region is not yet set at that time.

Especially when the laminating film pre-treated on its surface with the feel improver is used and the laminate is then exposed to the first and second doses of ionizing radiations, the film surface is much more activated. This appears to be because of the additive component being much more likely to migrate from the ink toward the laminating film (or onto the surface region of the resin layer).

Thus, if the laminate is exposed to the first dose of ionizing radiations to distribute the feel improver component locally on the surface region of the resin layer and subsequently to the second dose of ionizing radiations from either one side or both sides thereof to set the resin layer perfectly, it is then possible to obtain a stable and activated surface.

Usable to set the resin layer are electron beams emitted from various types of electron beam accelerators, e.g. Cockloftwalton, van de Graaff, resonance transformer, insulating core transformer, linear, dynatron and high frequency types of electron beam accelerators and having an energy in the range of 50–1,000 KeV, preferably 100–300 KeV. In general, doses of electron beams are 1–20 Mrad.

It is understood that the soft coat film of this invention may allow the support film to contain a colored layer and/or a metallized layer. The colored and/or metallized layers may be coated or vapor deposited on the support film in conventional manners, followed by the application of the resin layer thereon. A soft coat film is then obtained by treating the laminate with the aforesaid method.

Because the colored and/or metallized layers, if used, present a variety of colors or patterns, it is possible to obtain a soft coat film which serves not only as a protective layer for articles but also decorative purposes.

More conveniently, the soft coat film of this invention may include an adhesive layer provided on the backside of the support film. This enables it to be applied to articles more easily.

According to this invention, the soft coat film may also be constructed as a transfer sheet. This transfer sheet may be obtained by providing a releasable soft coat layer on a support film and, if required, providing at least one layer of printed, vapor-deposited and colored layers and an adhesive layer on the soft coat layer. This transfer sheet is transferred onto a desired article through its adhesive layer, and only the support film is then peeled off. In this way, the soft coat layer may be formed on the surface of said article.

The thus obtained soft coat film is characterized by showing sufficient elongation. In particular, the set resin layer in the soft coat film shows a glass transition temperature in the range of −150° C. to 20° C., so that cracking is unlikely to occur and an elongation of 0–1,000%, esp. 100% or more is obtained.

The present invention will now be explained in greater detail with reference to the following examples.

EXAMPLE 1

Thirty-three point three (33.3) g of isophorone diisocyanate were placed in a 500-ml separable flask equipped with a heater/stirrer unit and a separable cover with the dropwise addition of 0.1 g of di-n-butyltin dilaurate, wherein they were heated under agitation at 40° C. While 200 g of Prakcel 220AL (having a molecular weight of 2000 and made by Daicel Chemical Industries, Ltd.) were added to the system so slowly that there was no sharp increase in the in-system temperature, the reaction was allowed to proceed. Two hours later, the reaction temperature was brought up to 60° C., at which 13 g of hydroxyethyl acrylate were added. Stirring was continued until IR-spectral peaks showing isocyanate groups at 2330 $cm^{-1}$ disappeared. After the reaction had come almost quantitatively to an end, the desired urethane compound was obtained.

Added to 40 parts by weight of the thus obtained urethane acrylate compound were 10 parts by weight of PR-202 (an urethane acrylate product made by Mitsubishi Chemical Industries, Ltd.), 50 parts by weight of diethoxyethyl acrylate (Biscoat 190 made by Osaka Yuki Kogyo K.K.) and 0.5 parts by weight of silicone AK-30 (Made by Toa Gosei Kagaku K.K.) to prepare a coating solution. According to the coating scheme shown in FIG. 1, the coating solution was coated on a 150-μm thick polyvinyl chloride sheet (made by Sanpo Jushi Kogyo K.K.) in a larger-than-required amount to form an ink mass. Then, a matted polyethylene terephthalate film having a surface average roughness (Ra) of 1.0 μm (made by Kimoto K.K.) was laminated on the resulting coat, which was in turn irradiated with electron beams from a curtain type of irradiator (operating at an accelerated voltage of 180 KV) in a first dose of 1 Mrad and then in a second dose of 5 Mrad at the same voltage. A soft coat film was obtained by releasing the matted film from the support film after the setting of the resin. The obtained soft coat film was estimated in the following manners.

(a) Nail Scratch Test

The coat was scratched two or three times with an index finger (over a length of about 30 mm) to make observations of whether or not it received serious scratches, unrecoverable scratches or scratches reaching the support film.

◯: No scratch found.

×: Scratches found.

(b) Cracking by Elongation

A 1-cm wide test piece was pulled at 20° C. and a speed of 100 mm/min. to measure an elongation at which cracking occurred.

(c) Adhesion Test

Checkers testing was performed according to JISK-5400 to estimate adhesion in terms of the number of unbonded checkers.

(d) Warm Water-resistant Test

A test piece was immersed in warm water of 50° C. for 24 hours to observe its surface state.
○: Nothing abnormal.
×: Anything abnormal.

(e) Moistureproof Test

A test piece was left in an atmosphere of 50° C. and 90% RH for 400 hours to make observations of whether or not it underwent cracking, blistering, peeling or serious discoloration.
○: Nothing abnormal.
×: Anything abnormal.

(f) Chemical-resistant Test

A test piece was immersed in a 5% aqueous solution of acetic acid at 20° C. for 96 hours, a 0.1 N aqueous solution NaOH at 50° C. for 240 hours and kerosene at 20° C. for 24 hours to make observations of whether or not it underwent cracking, blistering, peeling, serious discoloration and gloss changes.
○: Nothing abnormal.
×: Anything abnormal.

(g) Measurement of Tg

Tg was determined from Tan δ peaks measured by Rheovibron DDY-II-EP made by Toyo Baildwin Co., Ltd.

(h) Hand and Drape

A light touch was given to a test piece by an index finger to make estimation of how it felt.
○: Slimy feel akin to suede.
×: Other feels.

The results are reported in Table 2.

EXAMPLES 2–13

The procedure of Example 1 was followed to prepare soft coat films with the compositions referred to in Table 1, of which similar estimations were made. The results are again reported in Table 2.

COMPARATIVE EXAMPLE 1

Sixty-nine point six (69.5) g of tri-diisocyanate were placed in a 500-ml separable flask equipped with a heater/stirrer unit and a separable cover with the dropwise addition of 0.1 g of di-n-butyltin dilaurate, wherein they were heated under agitation at 40° C. While 18 g of 1,4-butanediol were added to the system so slowly that there was no sharp increase in the in-system temperature, the reaction was allowed to proceed. Two hours later, the reaction temperature was brought up to 60° C., at which 47 g of hydroxyethyl acrylate were added.

Stirring was continued until IR-spectral peaks showing isocyanate groups at 2330 cm-l disappeared. After the reaction had come almost quantitatively to an end, the desired urethane compound was obtained.

Added to 70 parts by weight of the thus obtained urethana acrylate compound were 30 parts by weight of M-5700 (made by Toa Gosei Kagaku K.K.), 10 parts by weight of dipentaerythritol hexaacrylate (DPHA made by Nippon Kayaku Kogyo K.K.) and 0.5 parts by weight of silicone AK-30 (made by Toa Gosei Kagaku K.K.) to prepare a coating solution. The procedure of Example 1 was followed to prepare soft coat films, of which similar estimations were made. The results are again reported in Table 1.

COMPARATIVE EXAMPLE 2

The procedure of Example 1 was followed to prepare soft coat films with the compositions referred to in Table 1, of which similar estimations were made. The results are again reported in Table 2.

(Notes)

(1) Urethane acrylate products
   (a) Products made by Nippon Gosei Kagaku K.K.)
       UV-3000B
       UV-3100B
   (b) Products made by Mitsubishi Chemical Industries, Ltd.
       PR-202
       PR-206
       PR-208
       PR-209
       PR-210
       PR-211
       PR-212
       PR-213
   (c) Products made by Nippon Kayaku K.K.
       HCU-501

(2) Monofunctional monomers
   (a) Products made by Kyoei-sha Yushi Kagaku K.K.
       THF-A: Tetrahydrofurfuryl acrylate
       PO-A: Phenoxyethyl acrylate
       HOP-A: 2-hydroxypropylacrylate
       MTG-A: Methoxytriethylene glycol acrylate
   (b) Products made by Toa Gosei Kagaku Kogyo K.K.
       M-150: N-vinyl-2-pyrrolidone
       M-5600: $CH_2\!=\!CHCOOCH_2CH_2COOH$
          acrylic acid dimer

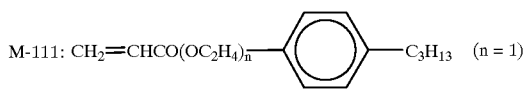

Acrylate of nonylphenol-ethylene oxide adduct.
   (c) Products made by Osaka Yuki Kagaku Kogyo K.K.
       Biscoat 190; $CH_2\!=\!CHCOO(CH_2CH_2O)_2C_3H_5$
          Ethoxydiethylene glycol acrylate
       Biscoat 158: $CH_2\!=\!CHCOOCH_2CH_2CH(CH_3)_2$ (3) Bifunctional acrylic monomer
   (a) Products made by Toa Gosei Kagaku Kogyo K.K.
       M-220: $CH_2\!=\!CHCOO(C_3H_5O)_3COCH\!=\!CH_3$
          Tripropylene glycol acrylate

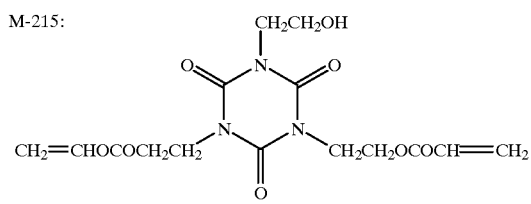

(b) Product made by Kyoei Yushi Kagaku Kogyo K.K.

DCP-A:

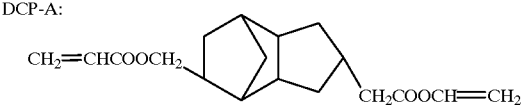

Hydrogenated dicyclopentadienyl acrylate

BA-134:

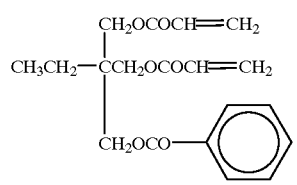

Trimethylolpropane acrylic acid benzoate

NP-A: $CH_2=CHCOOCH_2C(CH_3)_2CH_2COOCCH=CH_2$

Epoxy ester 3002:
  Diglycidyl ether diacrylate of an adduct of bisphenol A with 2 moles of propylene oxide
(c) Products made by Nippon Kayaku K.K.
  MANDA: Diacrylate of an ester of hydroxypivalate with neopentyl glycol
  HGA-240E;
    Diacrylate of an ester of an adduct of hydrogenated bisphenol A with 4 moles of propylene dioxide
  R-167: Diacrylate of a diglycidyl ether of 1,6-hexanediol (d) Products by Hodogaya Kagaku Kogyo K.K.
  AC-PTG1000:
    $CH_2=CHCOO(CH_2CH_2CH_2CH_2O)_n-OCCH=CH_2$
    (M.W.: 1,000)
(e) Product made by Osaka Kagaku Kogyo K.K.
  Biscoat 230:
    1,6-hexanediol diacrylate
(4) Trifunctional monomers
  Products made by Nippon Kayaku K.K.

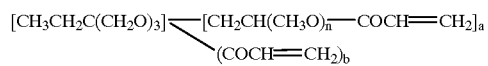

($\overline{n} \cdot \overline{a}=2$, a+b=3)
(6) Urethane acrylates prepared in the Examples
(7) Tetra- or more-functional acrylic monomers
  Product made by Nippon Rayaku K.K.

DPHA:

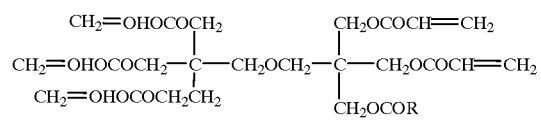

Mixture of acryloyl with hydroxy
(8) Mixture at a molar ratio of 1:1
(9) Urethane acrylate prepared in Comp. Ex. 1.

TABLE 1

| Ex. Nos. | (1) Urethane acrylate | (2) Monofunctional acrylate monomer | (3) Difunctional acrylic monomer | (4) Trifunctional acrylic monomer | (7) Tetra- or more-functional monomers | (5) Tactile improvers |
|---|---|---|---|---|---|---|
| Ex. 1 | 40 (6) PR-202 (10) | Biscoat 190 (50) | — | — | — | AX-30 (0.5) |
| Ex. 2 | UV-3000B (40) | Biscoat 190 (50) | K-220 (10) | TPA-320 (3) | — | X-22-170D (0.5) |
| Ex. 3 | UV-3000B (40) | THF-A (55) | MANDA (5) | — | — | AK-30 (0.5) |
| Ex. 4 | V-3100B (45) | M-150 (45) | 3002A (10) | — | — | RC720 (0.4), RC705 (0.1) |
| Ex. 5 | UV-3000B (45) | (8) K-150/N-5600 (45) | N-215 (10) | — | — | HK-2 (0.5) |
| Ex. 6 | PR-208 (75) | PO-A (20) | HBA-240E (5) | — | — | Fluoroslip 551 (3) |
| Ex. 7 | PR-209 (70) PR-202 (10) | K-5700 (20) | — | — | — | TUV6000 (0.5) |
| Ex. 8 | PR-210 (40) | Biscoat 158 (50) | DCP-A (10) Biscoat 230 (3) | — | — | X-22-161AS (0.5) |
| Ex. 9 | PR-211 (45) PR-202 (15) | HOP-A (40) | — | — | — | Lubron L-2 (2) |
| Ex. 10 | PR-212 (40) | K-111 (50) | R-167 (10) | — | — | Lubron L-2 (2) |
| Ex. 11 | PR-213 (40) | MTG-A (50) | BA-134 (10) NP-A (3) | — | — | Tosiphile F-203 (2) |
| Ex. 12 | UV-3000B PR-206 (100) | — | — | — | — | X-24-8201 (0.5) |
| Ex. 13 | PR-202 (50) | — | AC-PTG1000 (50) | — | DPHA (5) | L-7001 (0.5) |
| Comp. Ex. 1 | 70 (9) | M-5700 (30) | — | — | DPHA (10) | AK-30 (0.5) |
| Comp. Ex. 2 | HCU-501 (30) | — | — | — | DPHA (70) | AK-30 (0.5) |

TABLE 2

| Ex. Nos. | Nail scratch Test | Cracking by elongation (%) | Adhesion Test | Warm water-resistant test | Moisture-proof Test | Chemical-resistant Test | Tg/° C. | Hand and drape |
|---|---|---|---|---|---|---|---|---|
| Ex. 1 | ○ | 180 | 100/100 | ○ | ○ | ○ | −51 | ○ |
| Ex. 2 | ○ | 170 | 100/100 | ○ | ○ | ○ | −36 | ○ |
| Ex. 3 | ○ | 250 | 100/100 | ○ | ○ | ○ | −42 | ○ |
| Ex. 4 | ○ | 200 | 100/100 | ○ | ○ | ○ | −41 | ○ |
| Ex. 5 | ○ | 300 | 100/100 | ○ | ○ | ○ | −36 | ○ |
| Ex. 6 | ○ | 220 | 100/100 | ○ | ○ | ○ | −5 | ○ |
| Ex. 7 | ○ | 160 | 100/100 | ○ | ○ | ○ | +7 | ○ |
| Ex. 8 | ○ | 160 | 100/100 | ○ | ○ | ○ | −10 | ○ |
| Ex. 9 | ○ | 220 | 100/100 | ○ | ○ | ○ | −50 | ○ |
| Ex. 10 | ○ | 280 | 100/100 | ○ | ○ | ○ | −4 | ○ |
| Ex. 11 | ○ | 180 | 100/100 | ○ | ○ | ○ | −29 | ○ |
| Ex. 12 | ○ | 370 | 100/100 | ○ | ○ | ○ | −45 | ○ |
| Ex. 13 | ○ | 60 | 100/100 | ○ | ○ | ○ | −43 | ○ |
| Comp. Ex. 1 | ○ | 10 | 100/100 | ○ | ○ | × | +45 | × |
| Comp. Ex. 2 | ○ | 20 | 0/100 | ○ | ○ | ○ | −40 | × |

INDUSTRIAL APPLICABILITY

As recounted above, the soft coat films of this invention excel not only in flexibility, flexing properties and injury recovery, but also in such properties as scuffing resistance, wear resistance and chemical resistance. For that reason, they are very useful as protective layers for electrical appliances, furniture, office equipment, and the like.

What is claimed is:

1. A soft coat film having a soft tactile impression, said soft coat film comprising:

a support film; and a resin layer provided on said support film formed by irradiating a composition with ionizing radiation, said composition comprising (a) a urethane acrylate having a molecular weight of 500 to 50,000, said urethane acrylate comprising (1) an isocyanate compound containing at least two isocyanate groups, (2) a compound containing 1 to 4 hydroxyl groups, and (3) a compound containing 1 or 2 hydroxyl groups and 1 to 5 radically polymerizable groups, (b) a tactile improver present in an amount of 0.05 to 15 parts by weight per 100 parts by weight of the composition, said tactile improver selected from the group consisting of a silicone resin, a wax, and a fluorocarbon resin, and (c) an acrylic monomer having one or two radially polymerizable groups per molecule, said composition having a glass transistion temperature, after setting, of −150° C. to 20° C. and an elongation of 30 to 1,000%.

2. A soft coat film as recited in claim 1, in which the content of said urethane acrylate lies in the range of 20–95% by weight of the total composition.

3. A soft coat film as recited in claim 1, wherein, after setting, the resin layer has fine irregularities on its surface and a surface roughness in the range of 0.2–100 μm as expressed in terms of a center-line average roughness Ra.

4. A soft coat film as recited in claim 1, wherein said support film has a colored layer.

5. A soft coat film as recited in claim 1, wherein said support film has a metallized layer.

6. A soft coat film as recited in claim 1, wherein said support film is printed.

7. A soft coat film as recited in claim 1, wherein said support film is provided with an adhesive layer on its backside.

* * * * *

UNITED STATES PATENT AND TRADEMARK OFFICE
CERTIFICATE OF CORRECTION

PATENT NO. : 6,258,441 B1
DATED : July 10, 2001
INVENTOR(S) : Kiyoshi Oguchi and Yozo Kosaka It is certified that error appears in the above-identified patent and that said Letters Patent is hereby corrected as shown below:

<u>Title page,</u>
Item [62], Related U.S. Application Data, line 5, "5,401,349" to -- 5,401,348 --; and
Item [30], Foreign Application Priority Data, line 3, change "11-291769" to
-- 11-291767 --.

Signed and Sealed this

Sixteenth Day of April, 2002

Attest:

JAMES E. ROGAN
*Director of the United States Patent and Trademark Office*

*Attesting Officer*